United States Patent [19]

Meenen, Jr.

[11] Patent Number: 4,861,269

[45] Date of Patent: Aug. 29, 1989

[54] SIDESTICK FLIGHT CONTROL SIMULATOR

[75] Inventor: Raymond P. Meenen, Jr., Huntington Station, N.Y.

[73] Assignee: Grumman Aerospace Corporation, Bethpage, N.Y.

[21] Appl. No.: 175,377

[22] Filed: Mar. 30, 1988

[51] Int. Cl.⁴ .................................................. G09B 9/08
[52] U.S. Cl. ....................................................... 434/45
[58] Field of Search ................ 434/45, 30; 273/148 B; 244/223; 74/491

[56] References Cited

U.S. PATENT DOCUMENTS

| | | |
|---|---|---|
| 2,300,004 | 10/1942 | Nicholson . |
| 2,514,606 | 7/1950 | Jenny . |
| 2,909,852 | 10/1959 | Stern . |
| 3,007,258 | 11/1961 | Hemstreet et al. . |
| 3,023,516 | 3/1962 | Eisenberg . |
| 3,031,775 | 5/1962 | Cohen . |
| 3,220,121 | 11/1965 | Cutler . |
| 3,303,715 | 2/1967 | Zimer ..................... 74/470 |
| 3,378,938 | 4/1968 | Frasca . |
| 3,463,866 | 8/1969 | Staples . |
| 3,496,651 | 2/1970 | Briguglio et al. . |
| 3,523,665 | 8/1970 | Laynor, Jr. et al. ................. 244/83 |
| 3,529,365 | 9/1970 | Shelley . |
| 3,861,065 | 1/1975 | Courtenay et al. . |
| 4,024,651 | 5/1977 | Lantrip . |
| 4,150,803 | 4/1979 | Fernandez ........................ 74/491 X |
| 4,227,319 | 10/1980 | Guy et al. . |
| 4,236,325 | 12/1980 | Hall et al. ............................. 434/45 |
| 4,398,889 | 8/1983 | Lam et al. ............................. 434/45 |
| 4,422,851 | 12/1983 | Hayashigawa et al. .............. 434/45 |
| 4,477,044 | 10/1984 | Darcy et al. ......................... 244/223 |
| 4,490,117 | 12/1984 | Parker ................................. 434/45 |
| 4,504,233 | 3/1985 | Galus et al. .......................... 434/45 |
| 4,568,286 | 2/1986 | Acklam ................................ 434/45 |

Primary Examiner—Leo P. Picard
Assistant Examiner—Jessica J. Harrison
Attorney, Agent, or Firm—Pollock, Vande Sande & Priddy

[57] ABSTRACT

A sidestick grip is slidably mounted to achieve adjustable fore-aft displacement. Separate spring devices are linked to the grip for simulating break-out force and force-deflection characteristics. Each spring device is linked to a damper for damping grip movement in the pitch and roll directions. The spring devices have (1) variable spring pre-load bias thereby enabling adjustments of the breakout forces; and (2) adjustable stick neutral position. Transducers measure grip deflection in roll and pitch for utilization by a computer.

10 Claims, 2 Drawing Sheets

SIDESTICK FLIGHT CONTROL SIMULATOR

FIELD OF THE INVENTION

The present invention relates to an aircraft sidestick, and more particularly to such a stick particularly suited for aircraft simulators.

BRIEF DESCRIPTION OF THE PRIOR ART

The purely mechanical and the mechanical-hydraulic systems utilized in prior aircraft and aircraft simulators have been supplanted by multiple access controllers in which electrical signals, initiated by movement of a pilot-operated stick, are transmitted electrically or electronically to a computer-controlled simulator which is to feed back the "feel" of an aircraft in response to similar hand movements. It has been found that a number of adjustments is necessary to allow different pilots of different build to effectively use such a simulator flight stick and to accurately simulate the "feel" of a particular aircraft.

The prior art recognizes the importance of providing adjustments to sidestick controllers so that a pilot has a more true "feel" when using such a device. For example, U.S. Pat. No. 3,523,665 is directed to a three-axis controller for an aircraft having a fly-by-wire control system. A number of adjustments is provided for varying the artificial feel, break-out force and controller damping to suit each individual pilot. The patented device uses helical compression springs and hydraulic dampers to provide a feel force feedback to a pilot. This indicative prior art fails to meet the invention in several key respects:

1. The present device features variable stick neutral points in both the pitch and roll axes. The neutral point is the position which the stick grip assumes when no force is applied to it. The position of this neutral point is quite important to the proper functioning of a sidestick flight control.

2. The invention features an adjustable mount which allows the pilot to position the handgrip as appropriate for his arm length. This important capability is lacking in the patented device.

3. The invention has a built-in capability for generating asymmetric force versus deflection gradients in the roll axis. Some prior research has indicated that this may be a very important feature in a sidestick control as the human arm is considerably stronger in the inward (left roll) direction than the outward (right roll) direction. The patented device does not offer this capability.

4. The invention is much more simple than that of the referenced patent. The use of complex linkages is avoided in an effort to keep the amount of free play in the total mechanism to a minimum.

BRIEF DESCRIPTION OF THE INVENTION

The sidestick type flight control simulator described allows the simulation of virtually any sidestick installation for purposes of analysis and development of such installations in cockpit mockups and flight simulators. It requires no external interfaces except electrical wires from the stick position transducers and stick grip switches to the simulation equipment. Biomechanical parameters such as stick travel in pitch and roll, stick neutral position, breakout force, force versus deflection characteristics in pitch and roll, symmetry of force versus deflection in roll, viscous damping in pitch and roll axes, and stick position can all be varied independently by simple adjustments. In addition, the device can be easily modified to accept a variety of motion sensors such as linear variable differential transformers, potentiometers or optical encoders. It can also be equipped with miniature solid state strain gauges to sense force applied to the stick grip, thereby allowing simulation of a force sensing motion stick or an isometric control stick, when stick travel is set to zero.

The present invention offers a simple, reliable and highly flexible sidestick control which is capable of accommodating pilots having different builds so that the feel of the simulator and its operation can be customized. It is assumed that all future aircraft will feature computerized fly-by-wire or similar control systems in which there is no physical connection between the pilots' control stick and the aerodynamic control surfaces being controlled. This will require the sidestick itself to generate the necessary tactile cues to the pilot so he may gauge his control inputs. The purpose of this invention is to aid in the development of these advanced cockpits and control systems.

BRIEF DESCRIPTION OF THE FIGURES

The above-mentioned objects and advantages of the present invention will be more clearly understood when considered in conjunction with the accompanying drawings, in which.

DETAILED DESCRIPTION OF THE INVENTION

Figure 1:
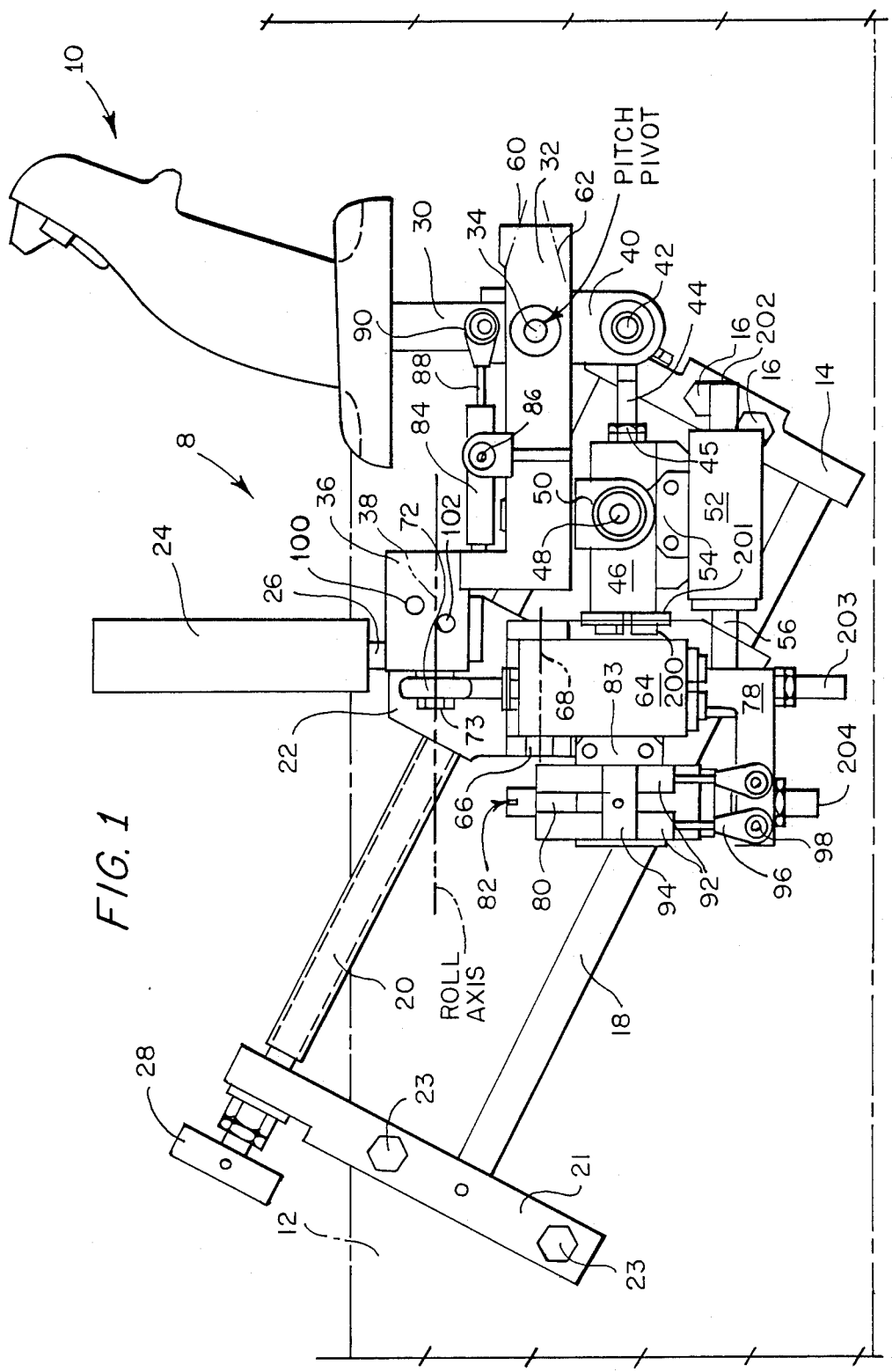
FIG. 1 is a side elevational view of the present sidestick flight control simulator.
Figure 2:
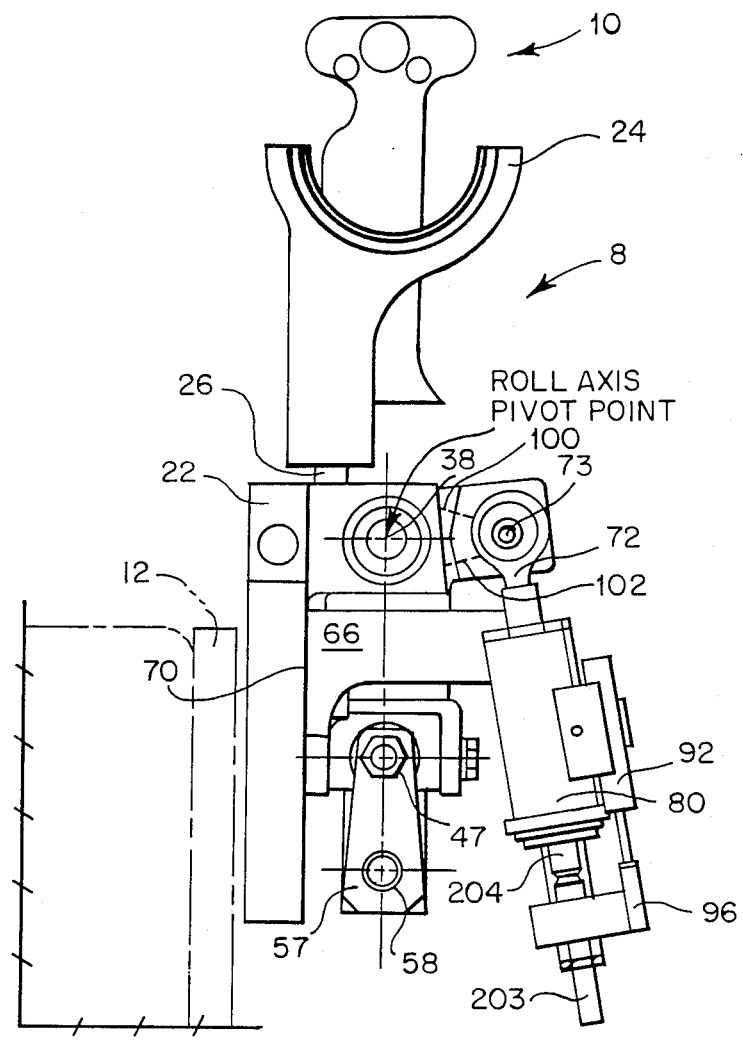
FIG. 2 is an end view of the sidestick flight control simulator.

The sidestick flight control simulator 8 of the present invention is illustrated in side elevational view in FIG. 1 and end view in FIG. 2. The simulator includes a conventional sidestick grip 10 which is normally located near the side of a pilot's seat 12. In order to mount the simulator, a bracket 14 is provided with fasteners 16 which secure the bracket to the side of the pilot's seat. A first fixed rail 18 extends perpendicularly from the bracket 14 while a second, threaded rail 20 also extends perpendicularly from bracket 14 and is in parallel spaced relationship with the first rail 18. A block 22 is mounted on the rails 18 and 20, the block 22 being adapted to undergo translational motion along the rails. Since all of the main simulator components, shown in FIGS. 1 and 2 are mounted to block 22, they will move along with the block 22, including sidestick grip 10. A second bracket 21 is provided on the upward ends of the rails 18 and 20, this latter bracket being secured to the side of a pilot's seat by fasteners 23. A wrist rest 24 is adjustably secured to block 22 by means of a shaft 26 which may be threaded or slidably configured to allow vertical adjustment of the height of the rest to accommodate the comfort requirements of a pilot. A knob 28 is secured to the outward end of threaded rail 20 so that, by turning the knob 28, the position of block 22, and consequently all of the main simulator components, are moved along the rails 18 and 20. This will cause horizontal and vertical motion of sidestick grip 10 to a point that will maximize the pilot's comfort.

The sidestick grip 10 is mounted to a shaft 30 which extends upwardly from a horizontally positioned bracket 32. The bracket includes a clearance through a central portion thereof to allow the vertical extension of a clevis 40 therethrough, the clevis including a pivot 34 which adjustably, rotatably mounts the handgrip shaft 30 to the bracket 32.

Block 22 extends to a journal bracket 36 (FIG. 1), through which pivot 38 passes. The left end (FIG. 1) of bracket 32 is mounted to the pivot 38 so that pivot 38 serves as a roll axis for sidestick grip 10.

In order to generate the correct feel for pitch control, resistance in the fore-aft direction of sidestick actuation must be developed. The following discussion pertains to the mechanisms for accomplishing this end.

A pivot 42 is located in the lower end of clevis 40, the pivot 42 mounting the eye end of rod 44 which is threadably adjustable with respect to its spring cartridge 46. Internally of the cartridge, a helical compression spring offers resistance to fore-aft displacement of grip 10. Means may be provided in the cartridge 46 for adjusting the pre-load of the helical compression spring located therein. Such a screw adjustment is by means of a threaded sleeve and is indicated in FIG. 1 by reference numeral 200 and its locknut by 201. The adjustment of the spring load determines the stick breakout force and commensurate force displacement characteristics in pitch. Nuts 45 and 47 (FIG. 2) are mounted on threaded rod 44 which varies the extension of the rods relative to the cartridge body. By adjusting the position of these nuts, the neutral position in pitch may be varied which causes the sidestick grip 10 to rotate to a new neutral position, depending upon the adjustment of the nuts 45. It should also be noted that spring cartridge 46 is supported below bracket 32 by a pivotal connection 48 and support clevis 50. The purpose of the pivotal attachment is to prevent binding of the spring cartridge due to minor misalignments when the stick is moved in the pitch direction.

A bi-directional hydraulic damper 52 is mounted, via bracket 54, to the body of spring cartridge 46 (FIG. 1). The screw adjustment 47 (FIG. 2) of threaded rod 44 (FIG. 1) and the left end of damper rod 56 are jointly supported by means of a coupler plate 57 (FIG. 2). The centering of the damper rod 56 is accomplished by means of a threaded engagement with coupler plate 57, shown as 58 (FIG. 2). The hydraulic damper 52 is preferably provided with an adjustable orifice which allows the amount of damping to be varied by means of a screwdriver adjustment within the rod 56, the adjustment being indicated at reference numeral 202 in FIG. 1. The amount of damping may be adjusted in order to create the proper feel during pitch change motion of the sidestick grip 10. It is to be noted that the resisting force for such a positional change of the sidestick grip is proportional to the rate of change occurring in the rod of the damper 52.

Thus, when sidestick grip 10 is moved fore-aft for simulated pitch changes, resistance is exerted by means of spring cartridge 46. Also, the damper 52 offers a resisting force based on the rate of change being attempted by the pilot on the grip 10. Limit stop screws 60, 62 located in bracket 32 engage confronting surfaces of clevis 40 and limit the fore and aft displacements.

A comparable set of devices is employed in the simulator to achieve simulation in the roll direction. In this connection, the roll axis pivot is shown in FIGS. 1 and 2 by reference numeral 38, which allows clockwise and counterclockwise rotation of the grip 10 and the pitch components just discussed. A spring cartridge 64, similar to spring cartridge 46 is pivotally mounted to clevis 66 at a pivot 68, shown in phantom in FIG. 1. The clevis 66 is itself mounted to block 22.

Roll force for left or right deflection of the sidestick grip 10 is normally symmetrical, but it may be made asymmetrical by an addition of one or more shims between the block 22 and the clevis 66. This asymmetry will cause the force required to rotate the sidestick grip 10 inward (counterclockwise as viewed in FIG. 2) to increase relative to that required to rotate it outward, thereby compensating for the greater strength of the human arm in the inward direction versus the outward. The thickness of shim 70 will determine the magnitude of asymmetry as it varies the relative moment arms of the roll spring cartridge 64 about the roll pivot point 38 for each direction of travel. An eye end 72 of the roll spring cartridge rod 203 is rotationally mounted to a pivot 73 which lies in parallel relationship with the roll axis pivot 38. Bracket 36 extends from block 22 and includes the pivot 38 therein about which the simulator devices roll. The lower end of rod 203 passes through bracket 78, the rod moving perpendicularly relative to the bracket during roll deflection. Since the roll spring cartridge 64 is similar to the pitch spring cartridge 46, similar adjustments may be provided.

Viscous damping about the roll axis of stick grip motion is provided by roll hydraulic damper 80 which is similar in design to pitch damper 52. As in the case with the pitch damper 52, the roll hydraulic damper 80 resists roll deflection forces proportionally to the rate of change of roll deflection on the sidestick grip 10. An adjustment of the damper 80 may be effected by adjustment of damper screw 82 located within the damper rod 204. A bracket 83 secures the damper 80 to the body of spring cartridge 64. Limit stop screws 100, 102 are located in bracket 36 and engage confronting surfaces of the left end of bracket 76 to limit roll displacement of the grip 10.

Since the simulator of the present invention is customarily designed to interface with a computer system for measuring and displaying pilot simulation operation, it is necessary to provide pitch and roll motion transducers which determine motion/displacement of the sidestick grip in the pitch and roll directions. The present invention is designed to accept a variety of motion transducers such as linear variable differential transformers, potentiometers, optical encoders, or other suitable components. The invention can also be equipped with miniature solid state strain gauges to sense force applied to the sidestick grip, thereby allowing simulation of a force sensing motion stick or an isometric control stick in which stick travel is set to zero. In FIG. 1 two parallel-disposed motion transducers 84 are mounted medially to pivot 86, while the transducer rods 88 have their eye ends mounted to pivots 90, the latter secured to shaft 30. As the grip is deflected in the fore-aft directions, the rods 88 are commensurately moved thereby generating corresponding electrical signals to be employed by a simulator computer, which is not, per se, part of the present invention. Similarly, parallel disposed transducers 92 are secured by bracket 94 to the housing of damper 80. The outward ends of the motion transducers 92 have corresponding rods extending outwardly to eye ends 96 which become individually secured to bracket 78 by pivots 98. As will be seen in FIG. 2, the rods of transducers 92 extend inwardly and outwardly which will generate commensurate electrical signals to be employed by a simulator computer. These signals are utilized by a computer in a well-known manner and do not, per se, form part of the present invention.

It should be understood that the invention is not limited to the exact details of construction shown and described herein for obvious modifications will occur to persons skilled in the art.

I claim:
1. A sidestick flight control simulator comprising:
a main stationary support;
a sidestick grip mounted to a separate support located in spaced relation to the stationary support;
a pitch assembly including
  (a) a first clevis for pivotally mounting the grip support thereby allowing pitch deflection of the grip,
  (b) first spring means for establishing break-away force and force-deflection characteristics, the spring means including a housing fastened to the first clevis and a displaceable rod pivotally mounted to a second clevis which is itself pivotally fastened to the grip support, the rod undergoing spring-loaded linked pitch displacement with the grip,
  (c) a first damper having its housing fastened to the housing of the first spring means,
  (d) first bracket means linking a rod of the damper to the spring means rod for damping motion of the spring means rod;
a roll assembly including
  (a) means for pivotally mounting the first clevis in the roll direction, thereby allowing roll deflection of the grip,
  (b) a third clevis extending to the main stationary support and pivotally mounting a second spring means,
  (c) a rod of the second spring means having a first end pivotally mounted to the main stationary support while the housing thereof is pivotally mounted to the third clevis, wherein roll deflection of the grip results in spring-loaded linked displacement of the rod simulating force-displacement characteristics in the roll direction,
  (d) a second damper having its housing fastened to the housing of the second spring means,
  (e) second bracket means linking a rod of the second damper to the second spring means rod for damping motion of the second spring means.

2. The structure set forth in claim 1 together with limit stops located in the first clevis for limiting pitch deflection of the grip; and
further limit stops located in the main stationary support for limiting roll deflection of the grip.

3. The structure set forth in claim 1 together with means connected to the first and second spring means for adjusting roll and pitch neutral position of the grip.

4. The structure set forth in claim 1 together with means for adjusting the lateral position of the third clevis for varying the force versus deflection symmetry of the grip.

5. The structure set forth in claim 1 together with means mounted to the first and second spring means for adjustably simulating the break-out forces thereof.

6. The structure set forth in claim 1 together with means for slidably mounting the main stationary support thereby enabling diagonal fore-aft displacement of the grip.

7. The structure set forth in claim 1 together with a wrist rest mounted to the main stationary support in aligned proximity to the grip.

8. A sidestick flight control simulator comprising:
a main stationary support;
a sidestick grip mounted to a separate support located in spaced relation to the stationary support;
means for slidably mounting the main stationary support thereby enabling diagonal fore-aft displacement of the grip;
a wrist rest mounted to the main stationary support in aligned proximity to the grip;
a pitch assembly including
  (a) a first clevis for pivotally mounting the grip support thereby allowing pitch deflection of the grip,
  (b) first spring means for establishing break-away force and force-deflection characteristics, the spring means including a housing fastened to the first clevis and a displaceable rod pivotally mounted to a second clevis which is itself pivotally fastened to the grip support, the rod undergoing spring-loaded linked pitch displacement with the grip,
  (c) a first damper having its housing fastened to the housing of the first spring means,
  (d) first bracket means linking a rod of the damper to the spring means rod for damping motion of the spring means rod;
a roll assembly including
  (a) means for pivotally mounting the first clevis in the roll direction, thereby allowing roll deflection of the grip,
  (b) a third clevis extending to the main stationary support and pivotally mounting a second spring means,
  (c) a rod of the second spring means having a first end pivotally mounted to the main stationary support while the housing thereof is pivotally mounted to the third clevis, wherein roll deflection of the grip results in spring-loaded linked displacement of the rod simulating force-displacement characteristics in the roll direction,
  (d) a second damper having its housing fastened to the housing of the second spring means,
  (e) second bracket means linking a rod of the second damper to the second spring means rod for damping motion of the second spring means.

9. The structure set forth in claim 8 together with:
means connected to the first and second spring means for adjusting roll and pitch neutral position of the grip;
means for adjusting the lateral position of the third clevis for varying the force versus deflection symmetry of the grip;
means mounted to the first and second spring means for adjustably simulating the break-out forces thereof;
limit stops located in the first clevis for limiting pitch deflection of the grip; and
further limit stops located in the main stationary support for limiting roll deflection of the grip.

10. The structure set forth in claim 9 together with transducer means for measuring deflection of the grip in pitch and roll.

* * * * *